(12) United States Patent
Malan et al.

(10) Patent No.: US 11,916,406 B1
(45) Date of Patent: Feb. 27, 2024

(54) TECHNIQUES FOR WIRELESS POWER SYSTEMS POWER DELIVERY

(71) Applicant: Apple Inc., Cupertino, CA (US)

(72) Inventors: Wynand Malan, Auckland (NZ); Wenwei Wang, Auckland (NZ)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 17/830,722

(22) Filed: Jun. 2, 2022

Related U.S. Application Data

(60) Provisional application No. 63/245,052, filed on Sep. 16, 2021.

(51) Int. Cl.
*H02J 50/60* (2016.01)
*H02J 50/90* (2016.01)
*H02J 50/12* (2016.01)
*H02J 50/40* (2016.01)

(52) U.S. Cl.
CPC .............. *H02J 50/60* (2016.02); *H02J 50/12* (2016.02); *H02J 50/90* (2016.02); *H02J 50/402* (2020.01)

(58) Field of Classification Search
CPC ...... H02J 50/10–12; H02J 50/60; H02J 50/90; B60L 53/12–122; B60L 53/124; H01F 38/14
See application file for complete search history.

(56) References Cited

U.S. PATENT DOCUMENTS

| | | | |
|---|---|---|---|
| 9,893,535 B2 | 2/2018 | Leabman | |
| 10,236,725 B1 | 3/2019 | Shahsavari et al. | |
| 10,797,534 B2 | 10/2020 | Shahsavari et al. | |
| 11,038,382 B2 | 6/2021 | Park et al. | |
| 11,296,558 B2 | 4/2022 | Lee et al. | |
| 2013/0241300 A1* | 9/2013 | Miyamoto | H02J 50/12 307/104 |
| 2018/0337557 A1* | 11/2018 | Chen | H02J 50/90 |
| 2020/0169124 A1* | 5/2020 | Mehas | H02J 50/12 |
| 2020/0271813 A1 | 8/2020 | Cheikh | |
| 2021/0175728 A1 | 6/2021 | Wang et al. | |

(Continued)

FOREIGN PATENT DOCUMENTS

| | | |
|---|---|---|
| KR | 2206468 B1 | 1/2021 |
| WO | 2022098156 A1 | 5/2022 |

*Primary Examiner* — Daniel Cavallari
*Assistant Examiner* — David A Shiao
(74) *Attorney, Agent, or Firm* — Treyz Law Group, P.C.; Joseph F. Guihan

(57) ABSTRACT

A wireless power system has a wireless power transmitting device and a wireless power receiving device. The wireless power transmitting device may include a coil and wireless power transmitting circuitry coupled to the coil. The wireless power transmitting circuitry may include impulse response measurement circuitry that measures the inductance of the power transmitting coil and the quality factor of the power transmitting coil. The measured inductance and quality factor may subsequently be used to determine a position of the wireless power receiving device relative to the wireless power transmitting device. The determined position of the wireless power receiving device relative to the wireless power transmitting device may be used to estimate an expected power loss associated with the power transmitting coil. The power transfer operations may be adjusted based on expected and actual power losses.

20 Claims, 5 Drawing Sheets

(56) References Cited

U.S. PATENT DOCUMENTS

| | | | |
|---|---|---|---|
| 2021/0408846 A1* | 12/2021 | Wu | H02J 50/60 |
| 2022/0173618 A1 | 6/2022 | Park | |
| 2023/0299621 A1* | 9/2023 | Wu | H02J 50/80 |
| | | | 320/108 |

* cited by examiner

TECHNIQUES FOR WIRELESS POWER SYSTEMS POWER DELIVERY

This application claims priority to U.S. provisional patent application No. 63/245,052, filed Sep. 16, 2021, which is hereby incorporated by reference herein in its entirety.

FIELD

This relates generally to power systems, and, more particularly, to wireless power systems for charging electronic devices.

BACKGROUND

In a wireless charging system, a wireless power transmitting device transmits wireless power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

A wireless power system has a wireless power transmitting device and a wireless power receiving device. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power.

The wireless power transmitting circuitry may include impulse response measurement circuitry that measures the inductance of the power transmitting coil and the quality factor of the power transmitting coil. The measured inductance and quality factor may subsequently be used to determine a position of the wireless power receiving device relative to the wireless power transmitting device.

The determined position of the wireless power receiving device relative to the wireless power transmitting device may be used to estimate an expected power loss associated with the power transmitting coil. The expected power loss may be compared to an actual power loss that is determined using power loss accounting. If the difference between the expected power loss and the actual power loss is greater than a threshold magnitude, the power transfer rate may be reduced, or power transfer may be ceased entirely. If the difference between the expected power loss and the actual power loss is less than a threshold magnitude, the power transfer rate may be increased.

DETAILED DESCRIPTION

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a cellular telephone, tablet computer, laptop computer, removable battery case, electronic device accessory, wearable such as a wrist watch, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

Figure 1:
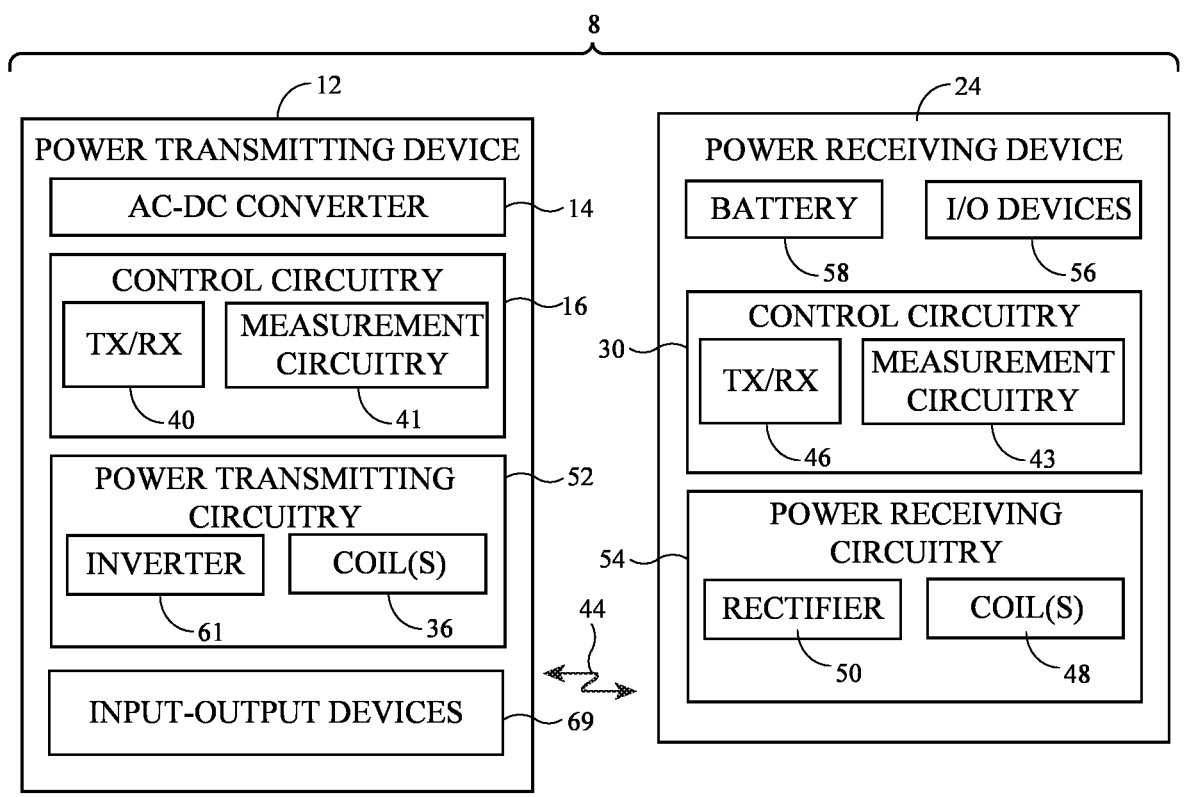
FIG. 1 is a schematic diagram of an illustrative wireless power system in accordance with an embodiment.

An illustrative wireless power system (sometimes called a wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a cellular telephone, a laptop computer, a tablet computer, a wearable such as an earbud or wrist watch, a wirelessly charged removable battery case for an electronic device, or other electronic equipment. Power transmitting device 12 may be coupled to a wall outlet (e.g., an alternating-current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable electronic device such as a cellular telephone, etc.) may have only a single wireless power transmission coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output. Device 12 may include input-output devices 69 (e.g., any of the input-output devices described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring one or more currents such as a wireless power transmitting coil current). Measurement circuitry 41 may be used, as an example, to determine an inductance and quality factor of coil 36.

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring one or more currents such as wireless power receiving coil current and/or rectifier output current).

Figure 2:
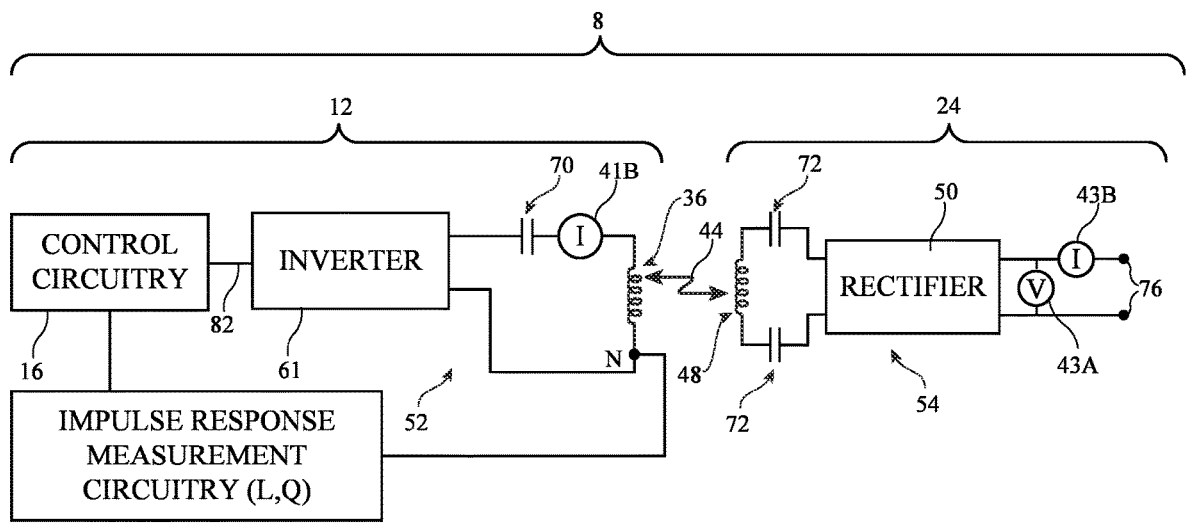
FIG. 2 is a circuit diagram of an illustrative wireless power system in accordance with an embodiment.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example).

As shown in FIG. 2, wireless power transmitting circuitry 52 includes inverter circuitry 61. Inverter circuitry (inverter) 61 may be used to provide signals to coil 36. During wireless power transmission, the control circuitry 16 of device 12 supplies signals to control input 82 of inverter 61 that cause inverter 61 to supply alternating-current drive signals to coil 36. Circuit components such as capacitor 70 may be coupled in series with coil 36 as shown in FIG. 2. Measurement circuitry 41 in device 12 may make measurements on operating currents and voltages in device 12. For example, current sensor 41B may be used to measure the coil current through coil 36. In other implementations, voltage across capacitor 70 is measured and current through the coil is inferred from that measurement.

As shown in FIG. 2, measurement circuitry 41 in device 12 may also include impulse response measurement circuitry 41A. Impulse response measurement circuitry 41A may be coupled to node N in wireless power transmitting circuitry 52. Control circuitry 16 may use impulse response measurement circuitry 41A to make measurements on the inductance (L) of coil 36 and quality factor (Q) of coil 36.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load. Measurement circuitry 43 in device 24 may make measurements on operating currents and voltages in device 24. For example, voltage sensor 43A may measure Vrect (the output voltage of rectifier 50) or a voltage sensor may measure the coil voltage on coil 48. Current sensor 43B may measure the rectifier output current of rectifier 50 or a current sensor may measure the current of coil 48.

If desired, some of the devices in wireless power system 8 may have both the ability to transmit wireless power signals and to receive wireless power signals. A cellular telephone or other portable electronic device may, as an example, have a single coil that can be used to receive wireless power signals from a charging puck or other wireless power transmitting device and that can also be used to transmit wireless power to another wireless power device (e.g., another cellular telephone, an accessory device, etc.). A device that can both transmit and receive wireless power may have all of the components of wireless power transmitting device 12 and all the components of wireless power receiving device 24 (e.g., power transmitting circuitry 52 and power receiving circuitry 54 are included in a single device). However, the functionality of the wireless power transmission and the wireless power reception is the same as described in connection with FIGS. 1 and 2. Therefore, although the examples herein will focus on a scenario where a dedicated wireless power transmitting device transfers charge to a dedicated wireless power receiving device, it should be understood that a device that both transmits and receives wireless power may be substituted for one or both devices.

During impulse response measurements, circuitry 16 uses impulse response measurement circuitry 41A (sometimes referred to as inductance measurement circuitry and/or quality factor measurement circuitry) to perform measurements of inductance L and quality factor Q. Control circuitry 16 may obtain measurements with circuitry 41A at regular intervals, in response to manual input, in response to wirelessly received commands, in response to information from one or more sensors within device 12, etc.

During the impulse response measurements, control circuitry 16 directs inverter 61 to supply one or more excitation pulses (impulses) to coil 36, so that the inductance L and capacitance of capacitor 70 in the wireless power transmitting circuitry 52 that includes that coil 36 form a resonant circuit. The impulses may be, for example, square wave pulses of 1 µs in duration. Longer or shorter pulses and/or pulses of other shapes may be applied, if desired. The resonant circuit resonates at a frequency near to the normal wireless charging frequency of coil 36 (e.g., about 120 kHz, 50-300 kHz, about 240 kHz, 100-500 kHz, more than 75 kHz, less than 400 kHz, or other suitable wireless charging frequency) or may resonate at other frequencies.

Figure 3:
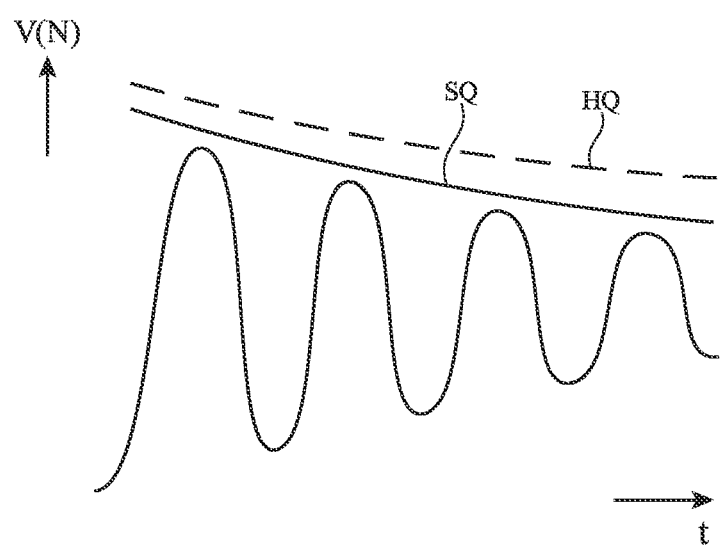
FIG. 3 is a graph of an illustrative impulse response to an applied impulse signal in a wireless charging system in accordance with an embodiment.

The impulse response (e.g., the voltage V(N) at node N) to the applied pulse(s) is as shown in FIG. 3. A voltage sensor in impulse response measurement circuitry 41A may measure the voltage at node N after the excitation pulses are applied to coil 36. The frequency of the impulse response signal of FIG. 3 is proportional to 1/sqrt(LC), where L is the inductance of coil 36 and C is the capacitance of capacitor 70. Therefore, L can be obtained from the known value of C and the measured frequency of the impulse response signal. Q may be derived from L and the measured decay of the impulse response signal. As shown in FIG. 3, if signal V(N) decays slowly, Q is high (e.g., HQ) and if signal V(N) decays more rapidly, Q is low (e.g., SQ). Measurement of the decay envelope of V(N) and frequency of V(N) of the impulse response signal of FIG. 3 with circuitry 41A will therefore allow control circuitry 16 to determine Q and L.

The values of quality factor and/or inductance determined by the impulse response measurement circuitry may be used to estimate the coupling coefficient (k) between the power transmitting coil 36 and the power receiving coil 48. Information received from the wireless power receiving device (e.g., through in-band communication or out-of-band communication) may also be used to estimate the coupling coefficient if desired.

Figure 4A:
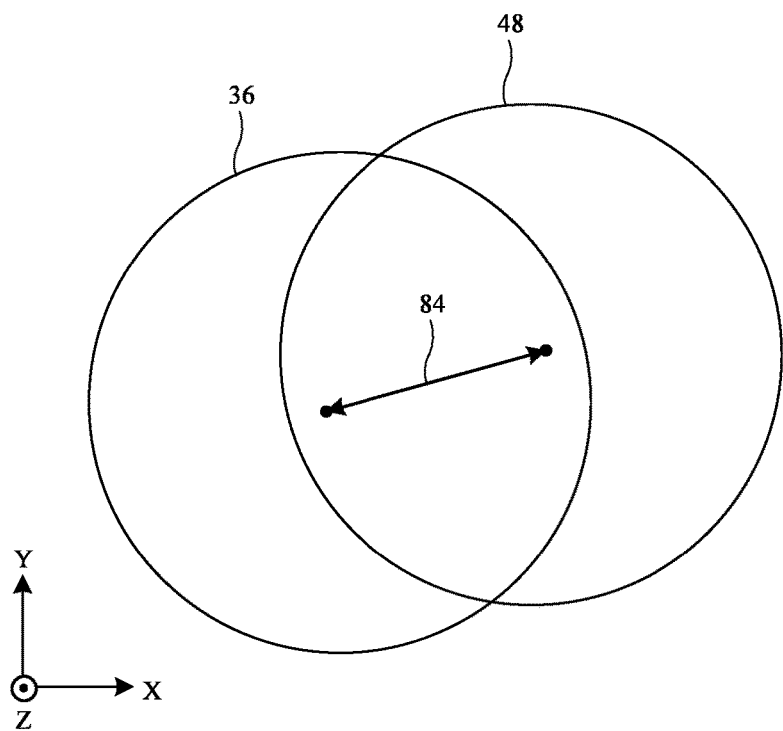
FIG. 4A is a top view of an illustrative wireless power system with lateral misalignment between a wireless power receiving coil and a corresponding wireless power transmitting coil in accordance with an embodiment.

The inductance and quality factor determined by impulse response measurement circuitry 41A, as well as the estimated coupling coefficient, may be used to determine the position of power receiving device 24 relative to power transmitting device 12. FIG. 4A is a top view of an illustrative wireless power system 8 showing how transmitting coil 36 may be laterally misaligned relative to receiver coil 48. For optimal power transfer efficiency, it is desirable for the centers of coil 48 and 36 to be vertically aligned (e.g., aligned in the Z-direction). However, in some cases coils 48 and 36 may not be perfectly aligned when the power receiving device 24 is placed on the power transmitting device 12 (e.g., the centers of coils 36 and 48 may not overlap). As shown in FIG. 4A, receiver coil 48 may be shifted within the XY-plane relative to transmitter coil 36 by distance 84. Because the magnitude of distance 84 impacts the properties of the wireless power transfer operations, it may be desirable for the wireless power system to know the magnitude of distance 84. Distance 84 may be determined at least based on the inductance and quality factor determined by impulse measurement response circuitry 41A. The estimated coupling coefficient may also be used to determine the magnitude of distance 84.

Coil 36 may be formed within a plane that is parallel to the XY-plane. Coil 48 may also be formed within a plane that is parallel to the XY-plane. The lateral misalignment 84 may refer to the offset between coils 36 and 48 (e.g., the centers of the coils) in a direction that is parallel to the planes of coils 36 and 48.

Figure 4B:
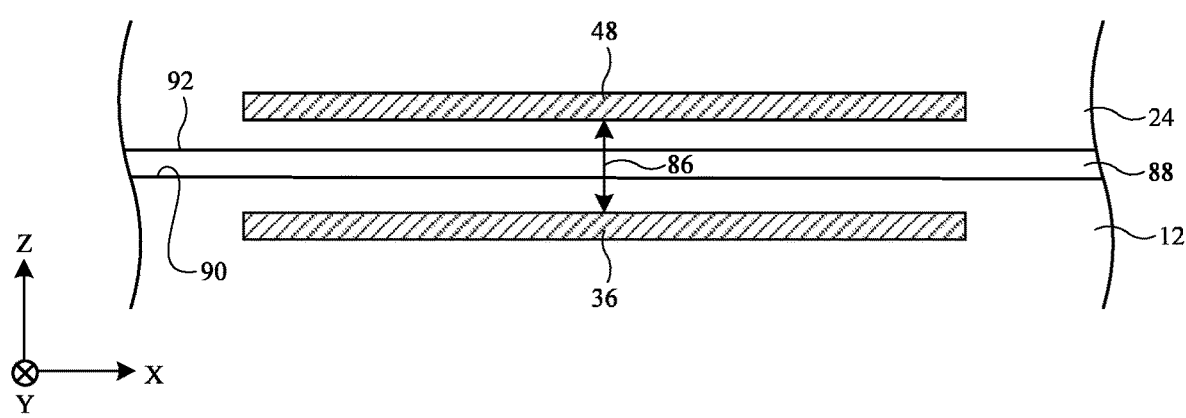
FIG. 4B is a cross-sectional side view of an illustrative wireless power system with a vertical gap between a wireless power receiving coil and a corresponding wireless power transmitting coil in accordance with an embodiment.

In addition to a lateral misalignment parallel to the XY-plane, receiving coil 48 may be separated from the power transmitting coil 36 by a variable gap height. FIG. 4B is a cross-sectional side view of an illustrative wireless power system 8 showing how transmitting coil 36 may be separated from receiver coil 48 by gap 86. For optimal power transfer efficiency, it is desirable for power receiving device 24 to be placed directly on power transmitting device 12. In other words, a surface 92 (e.g., a rear surface) of power receiving device 24 directly contacts the charging surface 90 of power transmitting device 12. In this arrangement, gap 86 (sometimes referred to as vertical gap 86 or distance 86) between coils 36 and 48 is at a minimum, resulting in a maximum power transfer efficiency.

However, in some cases distance 86 may be increased by the presence of an accessory such as a removable case 88 that is coupled to the power receiving device. When accessory 88 is coupled to power receiving device 24, the accessory 88 is interposed between the power receiving device and the power transmitting device when the power receiving device is placed on charging surface 90. The thickness of accessory 88 therefore increases the gap 86 between coils 36 and 48. Because the magnitude of distance 86 impacts the properties of the wireless power transfer operations, it may be desirable for the wireless power system to know the magnitude of distance 86. Distance 86 may be determined at least based on the inductance and quality factor determined by impulse measurement response circuitry 41A. The estimated coupling coefficient may also be used to determine the magnitude of distance 86.

Coil 36 may be formed within a first plane that is parallel to the XY-plane. Coil 48 may also be formed within a second plane that is parallel to the XY-plane. The gap 86 may refer to the distance between the first plane and the second plane in a direction that is orthogonal to the first and second planes. In other words, gap 86 defines the separation in the vertical direction (Z-direction) between the first and second planes.

Figure 5:
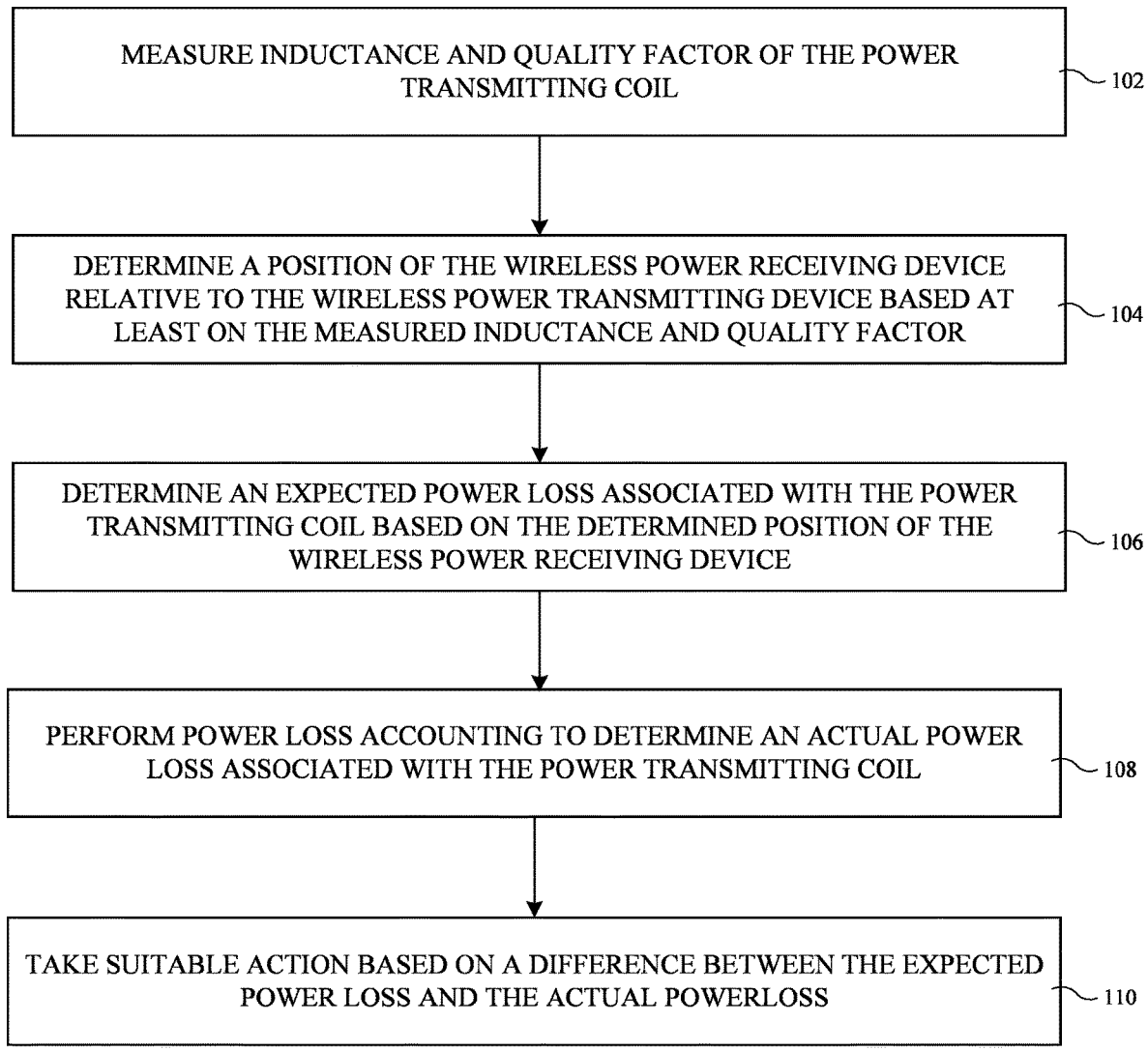
FIG. 5 is a flowchart of illustrative operations performed by a wireless power transmitting device that determines a position of a wireless power receiving device and estimates power loss based at least on the position of the wireless power receiving device in accordance with an embodiment.

FIG. 5 is a flowchart of illustrative operations for operating a wireless power transmitting device. The operations of FIG. 5 may be performed by, for example, control circuitry 16 within power transmitting device 12. During the operations of block 102, measurement circuitry 41 such as impulse response measurement circuitry 41A in FIG. 2 may be used to measure the inductance and quality factor of coil 36. As previously described in connection with FIGS. 2 and 3, measurement of the decay envelope and frequency of an impulse response signal may be measured using circuitry 41A to determine inductance (L) and quality factor (Q). Also during the operations of block 102, the control circuitry in power transmitting device 12 may estimate the coupling coefficient (k) using the information (e.g., measured inductance and/or quality factor) from impulse response measurement circuitry 41A.

Next, during the operations of block 104, control circuitry 16 may determine a position of the wireless power receiving device 24 relative to the wireless power transmitting device 12. Control circuitry 16 may determine the position of wireless power receiving device 24 relative to power transmitting device 12 using the inductance measured during block 102, the quality factor measured during block 102, and/or the estimated coupling coefficient.

The position of power receiving device 24 relative to power transmitting device 12 may be characterized using one or more coordinates (e.g., x, y, and z coordinates). For example, a (0, 0) position for the (x, y) coordinates of wireless power receiving device 24 may be defined as the point where coils 36 and 48 have no lateral misalignment (e.g., the centers of coils 36 and 48 overlap in the Z-direction in FIG. 4A).

The minimum vertical gap 86 between the coils may be greater than 0 (due to the thickness of the charging surface of the power transmitting device and/or the thickness of the rear housing wall of the power receiving device). The determined magnitude of the vertical gap may therefore be characterized in the z-coordinate in absolute terms (e.g., the actual distance between coils 36 and 48) or relative to the minimum distance (e.g., where the minimum distance is characterized as a vertical gap of 0 and larger distances are characterized as a vertical gap of actual distance minus minimum distance).

For example, the minimum distance 86 between coils 36 and 48 (e.g., when device 24 is placed directly on device 12) may be 3 millimeters. If a 2 millimeter thick accessory is interposed between devices 12 and 24, the vertical gap may be characterized as 5 millimeters (in absolute terms) or 2 millimeters (relative to the minimum gap). Either convention is suitable for characterizing the position of the power receiving device.

The aforementioned example of using the center of coils 36 and 48 as a reference point for characterizing the coil position is merely illustrative. In some arrangements, coil 36 and/or 48 may have a non-circular arrangement. In general, any desired point of wireless power transmitting device 12 and/or wireless power receiving device 24 may be used to characterize the position of wireless power receiving device 24 relative to wireless power transmitting device 12.

Moreover, the aforementioned example of using (x, y, z) coordinates to characterize the position of wireless power receiving device 24 relative to wireless power transmitting device 12 is merely illustrative. In another possible arrangement, the magnitude of lateral misalignment 84 may be used to characterize receiver position (e.g., without specifying the direction of the misalignment). The magnitude of the misalignment may be the key factor that determines the impact of the misalignment on wireless power transfer operations. Therefore, the direction of the misalignment vector may be omitted from the position characterization. In other words, a receiver coil 48 that is shifted by 2 millimeters in the positive X-direction may have a similar wireless charging performance to a receiver coil that is shifted by 2 millimeters in the negative X-direction. In both of these examples, the lateral misalignment can be represented simply using the magnitude 2 millimeters. This type of characterization of position may be represented using (r, z), where r is the magnitude of lateral misalignment and z is the magnitude of separation in the vertical direction (Z-direction).

An algorithm may be used to determine the position of the wireless power receiving device based on inductance and quality factor. In general, the vertical position of the wireless power receiving device may have a strong correlation with the measured coil inductance. Therefore, control circuitry 16 may determine the magnitude of the vertical gap based on the measured coil inductance. In general, the lateral misalignment of the wireless power receiving device may have a strong correlation with the measured coil quality factor. Therefore, control circuitry 16 may determine the lateral misalignment of the wireless power receiving device based on the measured coil quality factor.

In addition to using the measured inductance and quality factor to determine the position of the power receiving device, control circuitry 16 may use information from the wireless power receiving device. For example, each wireless power receiving device 24 may have expected inductance and quality factor values (and, optionally, coupling coefficients) for power transmitting coil 36 at a (0, 0, 0) position (e.g., without misalignment). This anchor point (known inductance, quality factor, and/or coupling coefficient values at a known position) may be used by control circuitry 16 to tune/scale an algorithm that determines the receiver position based on inductance and quality factor. Additional anchor points may be used to further improve the accuracy of control circuitry 16 in determining position based on inductance and quality factor. For example, each wireless power receiving device may have additional known inductance and quality factor values for power transmitting coil 36 at various misalignment positions (e.g., (0, 0, 1), (0, 0, 2), (1, 0, 0), etc.).

Wireless power receiving device 24 may indicate one or more anchor points to power transmitting device 12 using in-band communication or out-of-band communication. Alternatively, wireless power receiving device 24 may indicate its device type to power transmitting device 12 (e.g., using in-band communication or out-of-band communication). Power transmitting device 12 may have one or more anchor points stored in memory associated with various device types. For example, a first wireless power receiving device may indicate that it is a wrist watch device and a second wireless power receiving device may indicate that it is a cellular telephone. Power transmitting device 12 has one or more anchor points stored for the wrist watch device that are used to tune the position-determining algorithm when the power receiving device is indicated as a wrist watch device. Power transmitting device 12 also has one or more anchor points stored for the cellular telephone that are instead used to tune the position-determining algorithm when the power receiving device is indicated as a cellular telephone.

Next, during the operations of block 106, control circuitry 16 may determine an expected power loss associated with power transmitting coil 36 based on the position of the wireless power receiving device determined in block 104. Power loss refers to the amount of power that is lost during power transfer operations between coil 36 and 48. Some amount of power loss may be expected in wireless power system 8. However, the magnitude of the expected power loss may vary depending on the position of the wireless power receiving device 24 relative to wireless power transmitting device 12.

Therefore, the position of the wireless power transmitting device 24 determined in block 104 may be used to obtain a higher accuracy estimate of the expected power loss in block 106 (than if the position information was unknown). In addition to using the position from block 104, control circuitry 16 may determine an expected power loss in block 106 based on current information for the power transmitting coil 36. For example, current sensor 41B in FIG. 2 may be used to monitor the current of coil 36 during power transfer operations. A characterization of the current such as the root mean square current may be used in addition to receiver position to determine the expected power loss.

In addition to using the position information and coil current information to determine expected power loss, control circuitry 16 may also receive information from power receiving device 24 that is used to estimate expected power loss. For example, power receiving device 24 may transmit rectifier voltage (e.g., from sensor 43A in FIG. 2), rectifier current (e.g., from sensor 43B in FIG. 2), or other information regarding power receiving circuitry 54 to device 12 (e.g., using in-band communication or out-of-band communication). Control circuitry 16 may use the information from the power receiving device 24 when determining the expected power loss.

Next, during the operations of block 108, control circuitry 16 may perform power loss accounting to determine an actual power loss for the power transmitting coil 36. During power loss accounting, control circuitry 16 in device 12 may receive information from device 24 (e.g., via in-band communication or out-of-band communication) indicating the amount of power that device 24 is wirelessly receiving. Device 24 may indicate to device 12 an amount of power that device 24 is receiving or may indicate other characterizations of device 24 that device 12 then uses to derive the amount of power that device 24 is receiving. The information received by control circuitry 16 that characterizes the amount of power that device 24 is receiving may be referred to as received power information.

In addition to having the received power information from device 24, device 12 may also know how much power is actually being transmitted by coil 36. Control circuitry 16 in wireless power transmitting device 12 may determine the actual transmitted power based on the magnitude of the signal being used to drive coil 36 from inverter 61, based on the coil current measured by sensor 41B (e.g., the root mean square current of coil 36), and/or using other information regarding wireless power transmitting circuitry 52.

Ultimately, control circuitry 16 may compare the transmitted power (as determined using information regarding wireless power transmitting circuitry 52) to the received power (as indicated by wireless power receiving circuitry 54) to determine an actual power loss for coil 36. As a specific example, the transmitted power for coil 36 may be 5.0 W and the received power for coil 48 in device 24 may be 4.5 W. In this case, there is 0.5 W of power loss associated with the power transmitted by coil 36.

During the operations of block 110, control circuitry 16 may take suitable action based on a difference between the expected power loss (from block 106) and the actual power loss (from block 108). The actual power loss being greater than the expected power loss (by more than a threshold amount) may, for example, indicate the presence of a foreign metal object between the wireless power transmitting device 12 and the wireless power receiving device 24. If a foreign metal object is present between the wireless power transmitting device 12 and the wireless power receiving device 24, control circuitry 16 may cease power transfer operations (e.g., stop transmitting wireless power signals) or reduce the rate of power transfer.

In some embodiments, when power transfer operations are ceased or reduced (e.g., because a foreign metal object is determined to likely be present), control circuitry 16 may generate an alert to notify the user. The alert may be, for example, a visual indication displayed on power receiving device 24 or an auditory output emitted by power receiving device 24. For example, power transmitting device 12 may convey the alert to power receiving device 24 using in-band communication. Power receiving device 24 may then display a visual indication using a display, emit an auditory output using a speaker, or convey a tactile output using a haptic output device. Power receiving device 24 may convey these outputs using appropriate components, such as input-output devices 56 which may be display and/or audio components. Alternatively, or additionally, power transmitting device 12 may use one or more of input-output components 69 (e.g., a display, audio, or haptic component) to convey the alert to the user.

If the difference between the expected power loss and the actual power loss is high (e.g., greater than a first threshold), the power transfer rate may be reduced (and optionally ceased entirely). If the difference between the expected power loss and the actual power loss is low (e.g., lower than the first threshold), the power transfer rate may be increased or the power transfer operations may continue at the same rate. As a specific example, control circuitry 16 may use wireless power transmitting circuitry 52 in device 12 to transmit wireless power at 15 W to power receiving device 24. If the difference between the expected power loss and the actual power loss is greater than the first threshold, the power transfer is ceased. If the difference between the expected power loss and the actual power loss is less than the first threshold, the power transfer may continue at 15 W or the power transfer rate may be increased to a second, higher rate (e.g., 20 W, 25 W, 30 W, etc.). The increased power transfer rate may be higher than the initial power transfer rate by at least 3 W, at least 5 W, at least 10 W, at least 15 W, etc. The higher power transfer rate may be greater than 15 W, greater than 20 W, greater than 25 W, greater than 30 W, etc.

Control circuitry 16 may compare the difference between the expected power loss and the actual power loss to one or more thresholds during the operations of block 110. For example, a first threshold may be used to determine whether or not to cease power transfer. A second, lower threshold may be used to determine whether or not to increase the power transfer rate. For example, the first threshold may be 1.0 W and the second threshold may be 0.5 W. If the difference between the expected power loss and the actual power loss is greater than 1.0 W, power transfer operations may be ceased. If the difference between the expected power loss and the actual power loss is between 0.5 W and 1.0 W, power transfer operations may continue at the same rate. If difference between the expected power loss and the actual power loss is less than 0.5 W, the power transfer rate may be increased. The specific examples of thresholds used herein are merely illustrative. In general, any desired number of thresholds may be used and each threshold may have any desired magnitude.

Additional thresholds may be used to form more power loss zones, with each power loss zone corresponding to an acceptable maximum power transfer rate. For example, a first maximum power transfer rate may be used when the difference between expected power loss and actual power loss has a first magnitude, a second maximum power transfer rate (greater than the first maximum power transfer rate) may be used when the difference between expected power loss and actual power loss has a second magnitude (less than the first magnitude), a third maximum power transfer rate (greater than the second maximum power transfer rate) may be used when the difference between expected power loss and actual power loss has a third magnitude (less than the second magnitude), a fourth maximum power transfer rate (greater than the third maximum power transfer rate) may be used when the difference between expected power loss and actual power loss has a fourth magnitude (less than the third magnitude), and a fifth maximum power transfer rate (greater than the fourth maximum power transfer rate) may be used when the difference between expected power loss and actual power loss has a fifth magnitude (less than the fourth magnitude). In general, a lower difference between expected power loss and actual power loss may correlate to a greater maximum power transfer rate for the wireless power system.

It should be noted that, at the beginning of the operations of block 102, power transmitting device 12 may be inductively coupled to power receiving device 24. Power transmitting device 12 may transfer wireless power to power receiving device 24 at a given wireless power transfer rate before the operations of block 102. In this case, the power transfer operations may be paused for the inductance and quality factor measurements of block 102. Alternatively, the measurements of block 102 may be performed after power receiving device 24 is placed on power transmitting device 12 but before devices 12 and 24 enter a dedicated power transfer phase.

The example in FIG. 5 of using the determined power loss of block 106 in a comparison with power loss determined using power loss accounting is merely illustrative. In general, control circuitry 16 determining the position of the wireless power receiving device relative to the wireless power transmitting device (based on inductance and quality factor) may have numerous advantages/applications. In addition to being used to estimate power loss (as in block 106), the position determined in block 104 may be used to adjust settings in wireless power transmitting circuitry 52 to enhance wireless power transfer operations.

Similarly, control circuitry 16 determining the expected power loss associated with the power transmitting coil in block 106 may have numerous advantages/applications in addition to determining the difference between the expected and actual power loss and taking suitable action as in block 110. The expected power loss determined in block 106 may be used to adjust settings in wireless power transmitting circuitry 52 to enhance wireless power transfer operations.

The foregoing is merely illustrative and various modifications can be made to the described embodiments. The foregoing embodiments may be implemented individually or in any combination.

What is claimed is:

1. A wireless power transmitting device configured to transmit wireless power signals to a wireless power receiving coil in a wireless power receiving device, comprising:
   a coil configured to transmit the wireless power signals;
   inverter circuitry coupled to the coil; and
   control circuitry configured to:
   measure an inductance for the coil and a quality factor for the coil;
   determine a position of the wireless power receiving device relative to the wireless power transmitting device based at least on the measured inductance and the measured quality factor; and
   determine an expected power loss associated with the coil based at least on the determined position of the wireless power receiving device.

2. The wireless power transmitting device of claim 1, further comprising:
   a current sensor coupled to the coil, wherein the control circuitry is configured to:
   determine an actual power loss associated with the coil based at least on a current measured by the current sensor.

3. The wireless power transmitting device of claim 2, wherein the control circuitry is configured to:
   in accordance with determining that the expected power loss differs from the actual power loss by greater than a threshold magnitude, reduce a power level of the transmitted wireless power signals.

4. The wireless power transmitting device of claim 2, wherein the control circuitry is configured to:
in accordance with determining that the expected power loss differs from the actual power loss by greater than a threshold magnitude, stop the coil from transmitting the wireless power signals.

5. The wireless power transmitting device of claim 2, wherein the control circuitry is configured to:
in accordance with determining that the expected power loss differs from the actual power loss by less than a threshold magnitude, increase a power level of the transmitted wireless power signals.

6. The wireless power transmitting device of claim 1, wherein determining the position of the wireless power receiving device relative to the wireless power transmitting device comprises determining a lateral misalignment between a first center of the wireless power receiving coil and a second center of the coil.

7. The wireless power transmitting device of claim 1, wherein determining the position of the wireless power receiving device relative to the wireless power transmitting device comprises determining a lateral misalignment between the wireless power receiving coil and the coil.

8. The wireless power transmitting device of claim 7, wherein determining the lateral misalignment between the wireless power receiving coil and the coil comprises determining the lateral misalignment between the wireless power receiving coil and the coil using the measured quality factor.

9. The wireless power transmitting device of claim 1, wherein determining the position of the wireless power receiving device relative to the wireless power transmitting device comprises determining a magnitude of a vertical gap between a first plane that includes the wireless power receiving coil and a second plane that includes the coil.

10. The wireless power transmitting device of claim 9, wherein determining the magnitude of the vertical gap between the first plane that includes the wireless power receiving coil and the second plane that includes the coil comprises determining the magnitude of the vertical gap between the first plane that includes the wireless power receiving coil and the second plane that includes the coil using the measured inductance.

11. The wireless power transmitting device of claim 1, wherein measuring the inductance for the coil and the quality factor for the coil comprises measuring the inductance for the coil and the quality factor for the coil using impulse response measurement circuitry.

12. A non-transitory computer-readable storage medium storing one or more programs configured to be executed by one or more processors of a wireless power transmitting device configured to transmit wireless power signals to a wireless power receiving coil in a wireless power receiving device, wherein the wireless power transmitting device comprises a coil configured to transmit the wireless power signals and inverter circuitry coupled to the coil, the one or more programs including instructions for:
measuring an inductance for the coil and a quality factor for the coil;
determining a position of the wireless power receiving device relative to the wireless power transmitting device based at least on the measured inductance and the measured quality factor; and
determining an expected power loss associated with the coil based at least on the determined position of the wireless power receiving device.

13. The non-transitory computer-readable storage medium of claim 12, wherein determining the position of the wireless power receiving device relative to the wireless power transmitting device comprises determining a lateral misalignment between the wireless power receiving coil and the coil.

14. The non-transitory computer-readable storage medium of claim 12, wherein determining the position of the wireless power receiving device relative to the wireless power transmitting device comprises determining a magnitude of a vertical gap between a first plane that includes the wireless power receiving coil and a second plane that includes the coil.

15. The non-transitory computer-readable storage medium of claim 12, wherein measuring the inductance for the coil and the quality factor for the coil comprises measuring the inductance for the coil and the quality factor for the coil using impulse response measurement circuitry.

16. The non-transitory computer-readable storage medium of claim 12, wherein the wireless power transmitting device further comprises a current sensor coupled to the coil and wherein the one or more programs further include instructions for:
determining an actual power loss associated with the coil based at least on a current measured by the current sensor; and
in accordance with determining that the expected power loss differs from the actual power loss by greater than a threshold magnitude, reducing a power level of the transmitted wireless power signals.

17. A method of operating a wireless power transmitting device configured to transmit wireless power signals to a wireless power receiving coil in a wireless power receiving device, wherein the wireless power transmitting device comprises a coil configured to transmit the wireless power signals and inverter circuitry coupled to the coil, the method comprising:
measuring an inductance for the coil and a quality factor for the coil;
determining a position of the wireless power receiving device relative to the wireless power transmitting device based at least on the measured inductance and the measured quality factor; and
determining an expected power loss associated with the coil based at least on the determined position of the wireless power receiving device.

18. The method of claim 17, wherein determining the position of the wireless power receiving device relative to the wireless power transmitting device comprises determining a lateral misalignment between the wireless power receiving coil and the coil.

19. The method of claim 17, wherein determining the position of the wireless power receiving device relative to the wireless power transmitting device comprises determining a magnitude of a vertical gap between a first plane that includes the wireless power receiving coil and a second plane that includes the coil.

20. The method of claim 17, wherein the wireless power transmitting device further comprises a current sensor coupled to the coil, the method further comprising:
determining an actual power loss associated with the coil based at least on a current measured by the current sensor; and
in accordance with determining that the expected power loss differs from the actual power loss by greater than a threshold magnitude, reducing a power level of the transmitted wireless power signals.

* * * * *